(12) United States Patent
Safran et al.

(10) Patent No.: US 7,536,860 B2
(45) Date of Patent: May 26, 2009

(54) THERMO-MAGNETIC ACTUATOR

(75) Inventors: Les Safran, Westlake, OH (US);
Stephen L. Douglass, Newbury, OH (US)

(73) Assignee: Thermotion Corporation, Mentor, OH (US)

( * ) Notice: Subject to any disclaimer, the term of this patent is extended or adjusted under 35 U.S.C. 154(b) by 317 days.

(21) Appl. No.: 11/440,033

(22) Filed: May 25, 2006

(65) Prior Publication Data

US 2007/0271915 A1    Nov. 29, 2007

(51) Int. Cl.
*F15B 15/10* (2006.01)
*F15B 15/26* (2006.01)

(52) U.S. Cl. ............................. 60/523; 60/513; 60/531; 92/14; 92/19

(58) Field of Classification Search .................. 60/508, 60/512–513, 515, 523, 531, 670, 689; 92/5 R, 92/5 L, 14, 16, 19, 23–24, 28, 117 R; 335/219; 91/41–44
See application file for complete search history.

(56) References Cited

U.S. PATENT DOCUMENTS 2,555,046 A * 5/1951 Livers et al. .................. 91/389
2,578,992 A * 12/1951 Dickey .......................... 60/531
2,602,428 A *  7/1952 Randol ......................... 60/698
4,759,189 A    7/1988 Stropkay et al.
4,887,429 A * 12/1989 Birli et al. ...................... 60/527
5,396,770 A *  3/1995 Petot et al. ..................... 60/531
7,044,444 B2 *  5/2006 Haubold et al. ............. 251/279

* cited by examiner

*Primary Examiner*—Thomas E Denion
*Assistant Examiner*—Jonathan Matthias
(74) *Attorney, Agent, or Firm*—Leydig, Voit & Mayer, Ltd.

(57) ABSTRACT

A thermo-magnetic actuator includes a housing; a chamber within the housing; a working fluid changing phase upon heating and located in the chamber; an electrical heater disposed within the chamber for heating the working fluid; a piston rod slidably disposed in the housing and movable between retracted and extended positions; a spring biasing the piston rod toward the retracted position; an electromagnet disposed at an end of the housing and generating a magnetic field; and a ferromagnetic target assembly attached to the piston rod, sliding within the housing, and attracted toward the electromagnet to maintain the piston rod in the extended position even if electrical power is no longer applied to the heater. Preferably, the position of the piston rod is detected by the actuator and electrical current flow to the electrical heater is terminated when the piston rod is detected at the extended position.

11 Claims, 6 Drawing Sheets

THERMO-MAGNETIC ACTUATOR

FIELD OF THE INVENTION

The present invention relates to actuators in which linear motion of an object is produced in response to a stimulus, usually electrical power, and reversal of the motion results from withdrawal of the same stimulus or release of an influence preventing reversal of the motion. The invention particularly relates to actuators with reduced power consumption after application of the stimulus and before reversal of the linear motion. The invention further relates to actuators in which a magnetic field provides an influence for preventing reversal of the linear motion after withdrawal of the stimulus and until removal of the magnetic field.

BACKGROUND OF THE INVENTION

Actuators producing mechanical movement of an object in response to the application of a stimulus, such as electrical power, are well known. Among the types of actuators that are small and that respond to the application of electrical power to produce a linear motion are electrothermal actuators. Examples of such actuators are described in U.S. Pat. Nos. 4,759,189 and 4,887,429, which are incorporated by reference. Within these electrothermal actuators, a closed chamber contains a working fluid. The working fluid is mostly a liquid at ambient temperature and evaporates when heated. That gas phase of the fluid expands upon heating, increasing internal pressure within the chamber. In the following description, the reference to a fluid encompasses both of the liquid and gas phases, the gas phase expanding upon heating to provide the motive force of the actuator. The chamber includes an electrically powered heater that supplies heat to the fluid, in response to an electrical current supplied to the heater. The heat produces the phase change in the working fluid and pressure increase within the chamber. In response to the increased internal pressure in the chamber, a flexible rolling diaphragm, usually peripherally clamped to the package of the electrothermal actuator, is displaced. The diaphragm displacement pushes a piston that drives a piston rod in a linear direction, usually to increase the protrusion of the piston rod from the package of the electrothermal actuator.

Typically, an electrothermal actuator includes a return spring biasing the piston to withdraw the piston rod into the package of the actuator. The expansion of the working fluid and the movement of the diaphragm provide a force that counteracts the restoring force of the spring. In order to maintain a particular extension of the piston rod in many conventional electrothermal actuators, the pressure within the chamber must be sustained by continuing the flow of electrical current to the heater. In some applications, the continuing consumption of electrical power to keep the piston rod extended is undesirable and at least a reduction in the amount of electrical power supplied to maintain the extension of the piston rod is, in many applications, highly desirable One known electrothermal actuator, described in U.S. Pat. No. 5,396,770, reduces, and even eliminates, the necessity for continuing the supply of electrical power after extension of the piston rod. The electrothermal actuator described in that patent includes a latch mechanism that engages the piston rod when the piston rod is fully extended. The latch prevents retraction of the piston rod so that electrical power flow to the heater can be terminated. In order to release the piston rod so that it retracts within the package of the electrothermal actuator, the latch mechanism must be released. The latch mechanism includes a coil and a magnetic member. A magnetic field is produced by applying an electrical current to the coil. The magnetic field moves the magnetic member, releasing the latch, so that the piston rod retracts into the package of electrothermal actuator. When the piston rod is latched, the piston rod does not return to the initial position, with the piston rod retracted, upon loss or withdrawal of electrical power. In other words, the fail-safe position of the piston rod depends upon whether the piston rod has been latched before the loss of power. In many applications it is desirable that the fail-safe position, as in actuators without latches, be the retracted position of the piston rod.

SUMMARY OF THE INVENTION

Accordingly, it is desirable to provide an actuator in which the piston rod is extended in response to application of electrical power and in which the electrical power applied can be reduced after extension of the piston rod, while the piston rod remains extended, and in which, upon the failure of the electrical power, the piston rod retracts.

A thermo-magnetic actuator according to the invention includes a housing; a chamber within the housing; a working fluid changing phase upon heating and located within the chamber; an electrical heater disposed within the chamber for heating the working fluid upon application of electrical power to the electrical heater; a piston rod slidably disposed in the housing and movable between a retracted position, retracted with respect to the housing, and an extended position, extended with respect to the housing, the piston rod being driven and sliding from the retracted position to the extended position in response to heating of the working fluid by the electrical heater; a spring biasing the piston rod toward the retracted position; an electromagnet disposed at an end of the housing and generating a magnetic field when an electric current is supplied to the electromagnet; and a ferromagnetic target assembly attached to the piston rod, sliding within the housing, and attracted toward the electromagnet, when an electrical current flows through the electromagnet, to maintain the piston rod in the extended position even if electrical power is no longer supplied to the heater.

In one embodiment of the invention, the ferromagnetic target assembly includes a ferromagnetic collar attached to the piston rod. The ferromagnetic collar is held near the electromagnet by a magnetic field produced by the electromagnet, after the piston rod has reached the extended position. The piston rod reaches the extended position by the application of electrical power to the heater and driving of the piston by the expanding working fluid. Even after withdrawal of electrical power from the heater, the piston rod remains in the extended position until termination of electrical current flow to the electromagnet. Then, the ferromagnetic target assembly is no longer attracted by the electromagnet and the piston rod returns to the retracted position.

In a preferred embodiment of the invention, the ferromagnetic target assembly has a larger ferromagnetic mass than the ferromagnetic collar. The ferromagnetic target assembly in that embodiment includes a ferromagnetic target core to which the piston rod is attached and a tubular flange, preferably of a ferromagnetic material. The target core may also include a guide pin projecting coaxially with and opposite in direction from the piston rod and received within the piston. A second spring biases the piston and diaphragm away from the target core. The second spring urges the piston and the diaphragm to the same positions they occupy when the heater of the thermo-magnetic actuator is not energized, even while the ferromagnetic target assembly is held by magnetic attraction through the magnetic field produced by the electromagnet. In that situation, with no electrical current supplied to the heater, the piston rod remains in the extended position until electrical current is no longer supplied to the electromagnet.

Preferably, a control circuit controls the electrical current supplied to the heater to move the piston rod from the retracted position to the extended position. A position detector mounted on the actuator detects the position of the piston rod. The position detector includes a permanent magnet mounted on the ferromagnetic target assembly and a Hall-effect sensor that may be mounted on the housing responds to the permanent magnet when the piston rod is in the extended position. The control circuit uses the output of the Hall-effect sensor to terminate electrical current flow to the heater upon detection of the extended position of the piston rod, without interruption in electrical current flow to the electromagnet, so that the piston rod remains in the extended position, without current flow to the heater, until electrical current flow to the electromagnet is terminated.

BRIEF DESCRIPTION OF THE DRAWING FIGURES

In all figures like elements are given the same reference numbers to avoid the necessity of duplicate description

DETAILED DESCRIPTION OF THE INVENTION

Figure 1:
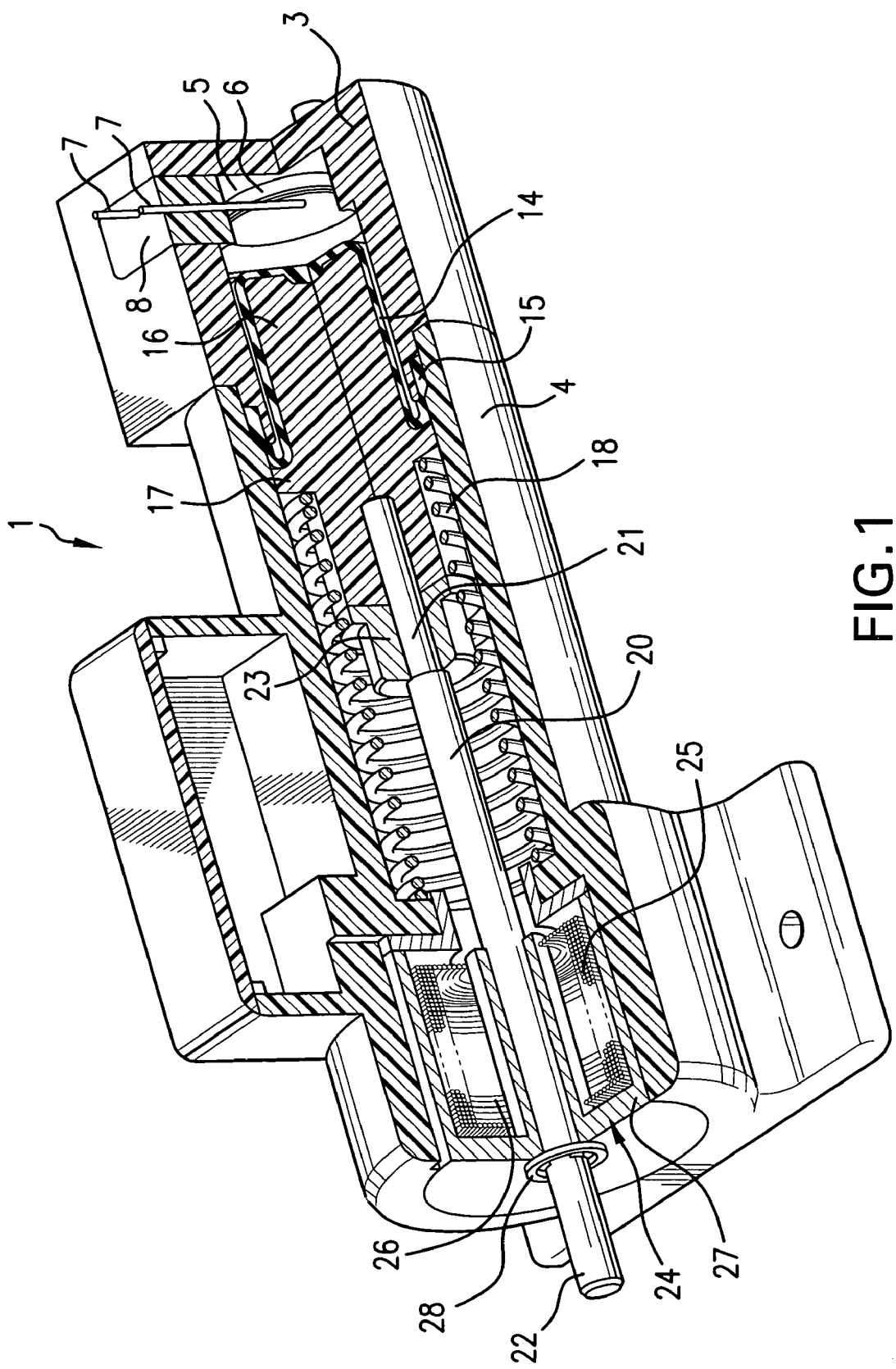
FIG. 1 is a pictorial cutaway view of an actuator according to a first embodiment of the invention.

FIG. 1 shows, in a partially sectioned pictorial view, a first embodiment of a thermo-magnetic actuator 1 according to the invention. The thermo-magnetic actuator 1 includes a housing having a rear or proximal housing part 3, and a distal housing part 4 that are joined together. The housing parts, as illustrated in FIG. 1, are preferably plastic parts that are bonded together, but could be metal. The plastic parts are a material able to withstand the temperature of the working fluid and other elevated temperatures produced by the heater that is described below. The proximal housing part 3 includes a chamber 5 that contains a working fluid, frequently a fluorocarbon. The chamber also houses an electrical heater 6, shown in the form of a disk, with electrical leads 7 that pass through the wall of the distal part of the housing so that an electrical current can be supplied to the heater 6. If the housing is electrically conducting, an electrically insulating material 8 fills an opening in the proximal housing part 3 to provide insulated passage of the electrical leads 7 through the housing of the thermo-magnetic actuator. The insulating material 8 is unnecessary if the proximal housing 3 is plastic.

A rolling diaphragm 14, opposite the chamber 5 has, in cross-section, a top hat shape. That diaphragm, which is a single piece of elastomeric or other flexible material, has a tubular part closed at one end and, at the opposite end, a peripheral flange 15, like the brim of a top hat. As shown in FIG. 1, the peripheral flange 15 is clamped between the proximal and distal housing parts 3 and 4. Those housing parts hold the peripheral flange 15 in place and anchor the rolling diaphragm 14.

The tubular part of the diaphragm 14 is filled by a piston 16. When the diaphragm is displaced to the left in 'FIG. 1 by the pressure of the gaseous phase of the heated working fluid, the piston 16 is driven towards the left side of FIG. 1. Adjacent to the part of the piston 16 fitting within the tubular part of the rolling diaphragm 14, a peripheral skirt 17 of the piston 16 slides along the inside surface of a tubular portion of the distal housing part 4, guiding the piston 16. A return spring 18, shown as a coil spring in FIG. 1, bears upon the peripheral skirt 17 of the piston 16 and urges the piston 16 in the direction of the chamber 5. The opposite end of the coil spring 18 bears at a fixed location on an internal surface of the distal housing part 4.

A piston rod 20 has a proximal end 21 embedded within the piston 16 and a distal end 22 extending outside the housing from the distal end of the distal housing part 4. Preferably, the piston rod 20 is coaxial with the piston 16 and the return spring 18 and is a non-magnetic material, such as stainless steel. The piston rod 20 is guided in movement by a tubular opening in an electromagnet, described below, and by the positioning of the proximal end 21 in the piston 16. The actuator includes a ferromagnetic target assembly that is attractable by a magnetic field produced by the electromagnet, as described below. The ferromagnetic target assembly in the embodiment of FIG. 1 includes a ferromagnetic collar 23 fixedly mounted on the piston rod 20 adjacent or near the piston 16. The magnetic collar 23 may be made of any suitable magnetic material, such as soft iron, that may be by attracted by a magnetic field.

An electromagnet 24 includes three parts that are coaxial with the piston rod 20. The electromagnet 24 is inserted within the distal end of the distal housing part 4 and includes an electrical coil 25 to which an electrical current can be supplied through leads not illustrated in FIG. 1. Most preferably, the coil 25 surrounds a tubular ferromagnetic core 26. Both the coil 25 and core 26 are disposed within a tubular housing 27 that, in turn, is permanently attached, for example by bonding, to the distal housing part 4. Preferably, the housing 27 is also a ferromagnetic material, for example, soft iron, aiding in holding the piston rod 20 in the extended position, as described below. The piston rod may optionally include a stop 28, extending circumferentially from the piston rod and located outside the housing, as shown in FIG. 1. The stop 28 prevents damage that might otherwise occur if a coaxial force is applied to the piston rod 20 directed toward the chamber 5.

Also shown in FIG. 1 are flanges and supports extending from the exterior surfaces of the distal part of the housing 4. While these elements are useful and even important in mounting of the thermo-magnetic actuator, they are not pertinent to the claimed invention and are not further described.

Figure 4:
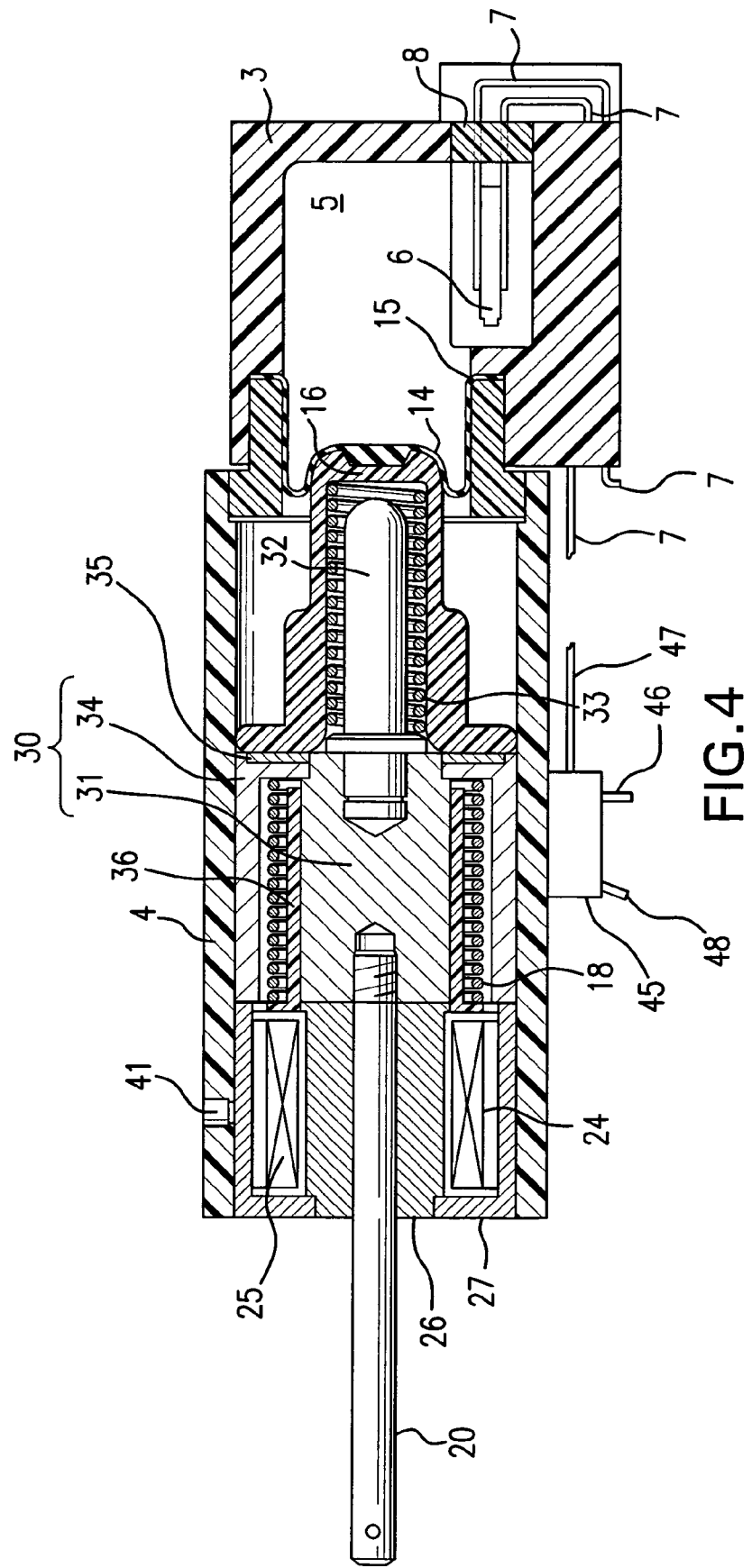
FIG. 4 is a cross-sectional view of the actuator of FIG. 2 with the piston rod in an extended position while power is being supplied to a heater of the actuator.
Figure 5:
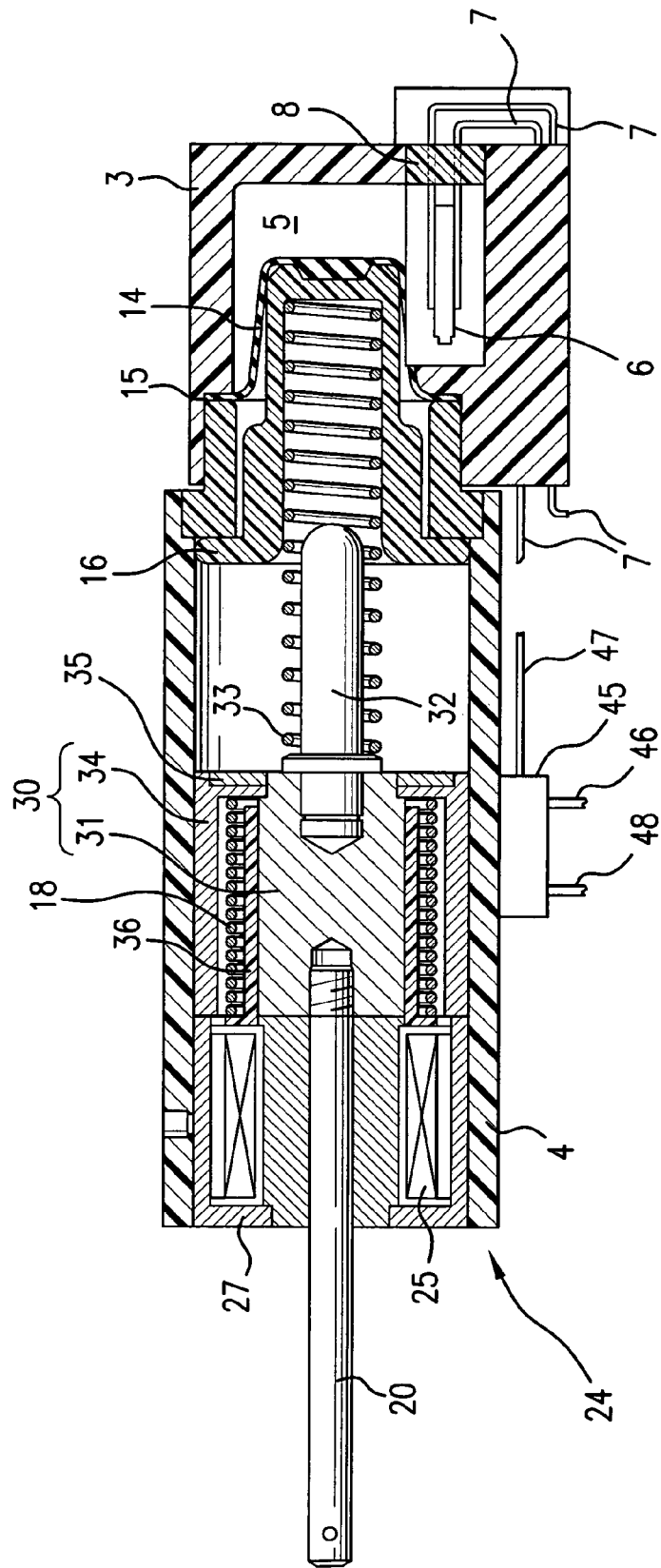
FIG. 5 is a sectional view of the actuator of FIG. 2 with the piston rod extended while power is applied to an electromagnet, but not to the heater, of the actuator.

As further described below, particularly with respect to FIGS. 4 and 5, the piston rod 20 can slide out of the retracted position illustrated in FIG. 1 to an extended position, extending farther from the housing, as shown in FIGS. 4 and 5. The sliding is brought about by heating and vaporizing of the working fluid in the chamber 5 in response to supplying of electrical power to the heater 6. The working fluid changes phase and applies sufficient force against the closed end of the rolling diaphragm 14 to displace the piston 16 toward the left in FIG. 1. This force, counteracting the restorative force of the return spring 18, causes the piston rod to extend further outward relative to the housing of the electrothermal actuator. That travel may be limited by the ferromagnetic collar 23 coming into contact with an internal surface of the distal housing part 4. At that location, the ferromagnetic collar 23 is relatively close to the electromagnet 24 and may be in contact with the housing 27.

According to an important feature of the invention, when the piston rod 20 is displaced along the axis of the piston rod, a direct current may be supplied to the electromagnet 24 to produce a magnetic field that attracts the ferromagnetic target assembly, here including the ferromagnetic collar 23. By providing sufficient magnetic attraction, the restorative force of the spring 18 can be overcome. Then, the magnetic field produced by the electromagnet holds the piston rod 20 in its extended position so that the motive force applied to the piston 16 by the working fluid is no longer necessary to maintain that extended piston rod position. In order to reduce power consumption, at that stage, the application of electrical power to the heater 6 is stopped. The working fluid cools and returns to the liquid phase so that the pressure applied by the working fluid to the rolling diaphragm 14 is released. However, the piston rod does not return to its retracted position because of the holding force provided by the magnetic field that is produced by the energized electromagnet 24 and that attracts the collar 23.

When it is desired to release the piston rod 20 so that the piston rod returns to the retracted position, current flow to the electromagnet 24 is stopped. The piston rod 20 returns relatively rapidly to the retracted position, the position shown in FIG. 1, provided the working fluid has sufficiently cooled. Generally, the return of the piston rod 20 to the retracted position from the extended position occurs more quickly than the reverse transition when the piston 16 is driven by the gaseous working fluid to the left in FIG. 1. The heater 6 requires a relatively large amount of power to maintain the working fluid in a gaseous state. However, a significantly smaller electrical power can be applied to the electromagnet 24 to maintain the piston rod 20 in the extended position, after that position is attained. Therefore, the overall power consumption by a thermo-magnetic actuator according to the invention can be substantially reduced over known electrothermal actuators. The thermo-magnetic actuator stays cooler than electrothermal actuators because the power consumption is lower. The piston rod 20, in most instances, returns to the retracted position more quickly than in electrothermal actuators, and, in the event of an electrical power failure, the piston 20 returns to the retracted position and does not remain in the extended position.

Figure 2:
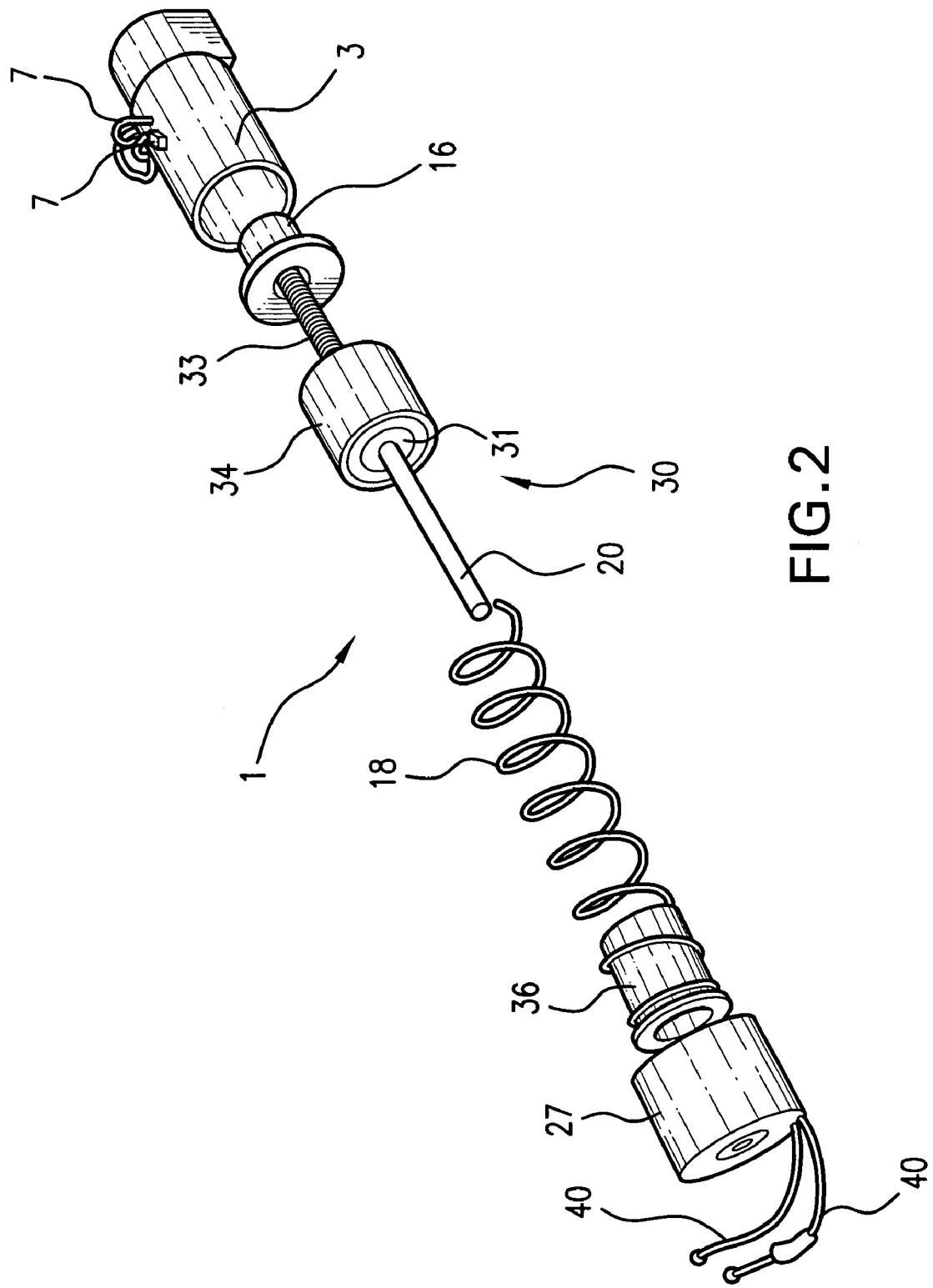
FIG. 2 is an exploded view of an actuator according to a second embodiment of the invention.

FIG. 2 shows, in an exploded view, from which certain elements have been omitted for clarity, a part of a second embodiment of the invention, employing the same principle for reduced power consumption by the thermo-magnetic actuator. More complete views, mainly in cross-section, of this second embodiment of the invention are provided in FIGS. 3-5. The thermo-magnetic actuator illustrated in FIGS. 2-5 has a larger ferromagnetic target assembly, in terms of magnetic material, than the embodiment of FIG. 1. The larger magnetic target assembly provides a larger attractive force with a magnetic field produced by the electromagnet 24 for additional security in maintaining the piston rod in the extended position after electrical power is no longer supplied to the heater. For brevity of disclosure, only the elements in the embodiment of FIGS. 2-5 that are different from the embodiment of FIG. 1 are described.

Turning initially to FIG. 2, the distal housing part 4 is removed to expose internal parts of the thermo-magnetic actuator. Further, the rolling diaphragm 14 is removed. The proximal housing part 3 has the piston 16 shown next to it. In the assembled electrothermal actuator, the piston 16 is received within the unillustrated rolling diaphragm 14 that has the peripheral flange 15 clamped between the proximal and distal parts of the housing as in the embodiment described with respect to FIG. 1.

The ferromagnetic target assembly 30 of the thermo-magnetic actuator of FIGS. 2-5 is substantially different in structure from the ferromagnetic collar 23 of the thermo-magnetic actuator of FIG. 1. Respective parts of the ferromagnetic target assembly are best understood by considering FIGS. 2-5 together.

Figure 3:
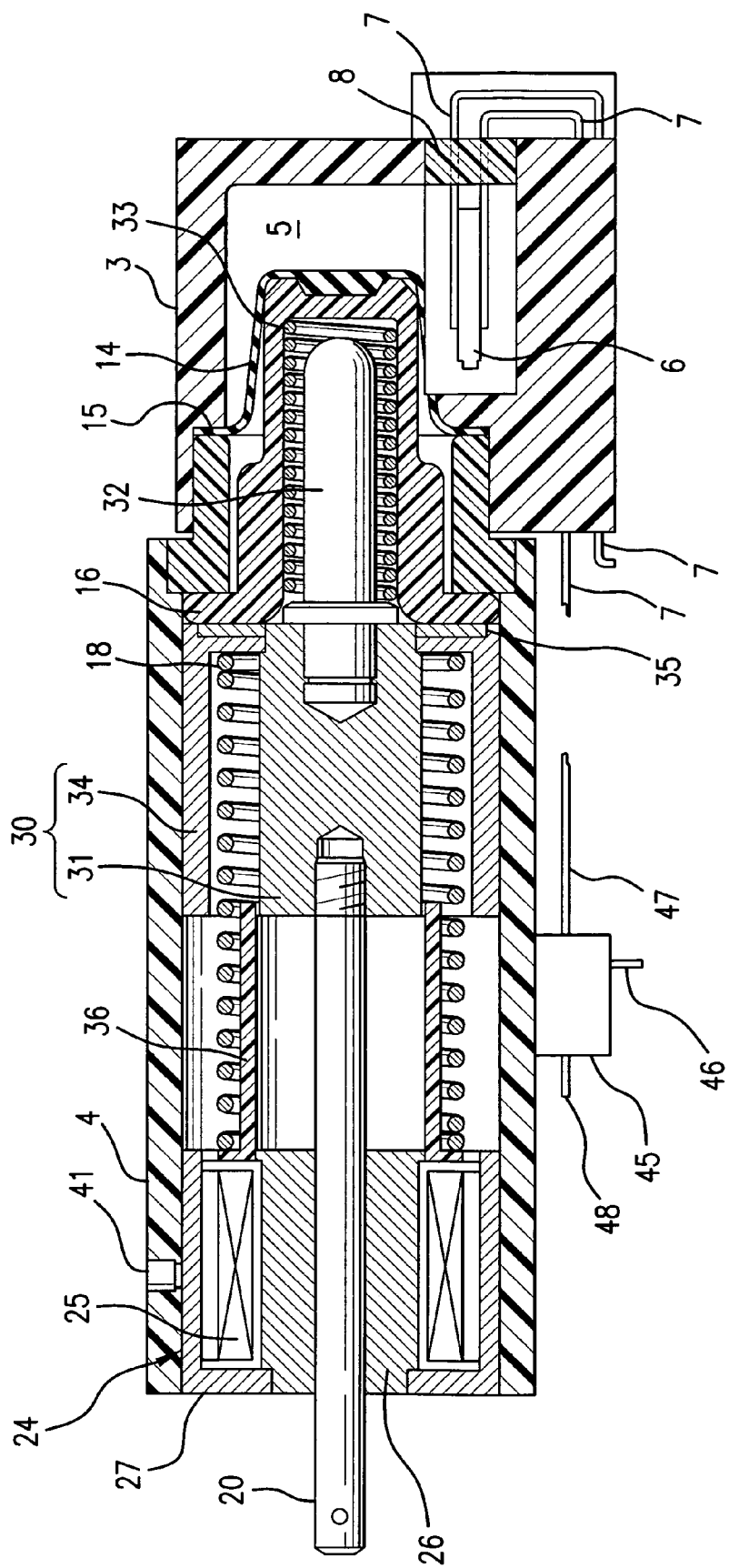
FIG. 3 is a cross-sectional view of the actuator of FIG. 2 with the piston rod in a retracted position.

The ferromagnetic target assembly 30 includes a central target core 31, coaxial with the piston rod 20. The proximal end of the piston rod 20 is embedded in the distal end of the target core 31. The target core 31 is a ferromagnetic material, such as soft iron, that can be attracted to a magnetic field produced by the electromagnet 24 when a direct current flows through the coil 25 of the electromagnet. A guide pin 32 (not visible in FIG. 2, see FIGS. 3 and 4) is embedded in and projects from the proximal end of the target core 31. The guide pin is coaxial with the piston rod 20 and, when the piston rod is in the retracted position, as shown in FIG. 3, the guide pin 32 is received within a tubular portion of the piston 16. A coil spring 33 surrounds the guide pin 32 and is interposed between the target core 31 and the piston 16. The spring 33 applies a force biasing the target core 31 away from the piston 16 and the rolling diaphragm 14, as discussed in further detail below. The ferromagnetic target assembly 30 also includes a tubular flange 34 having an end fixed to the proximal end of the target core 31. Preferably, the tubular flange 34 is also made of a ferromagnetic material, such soft iron. An annular space between the target core 31 and the flange 34 receives part of the spring 18 that applies a biasing force urging the target core 31, the piston 16, and the piston rod 21 toward the retracted position that is shown in FIG. 3. The side of the ferromagnetic target assembly 34 facing the piston 16 preferably includes an attached annular permanent magnet 35 (not visible in FIG. 2, see FIGS. 3 and 4) for magnetically indicating the position of the piston rod, as described below.

The thermo-magnetic actuator of FIGS. 2-5 also includes a tubular guide 36 attached to a part of the housing 27 of the electromagnet 24. A portion of the tubular guide 36 projects toward the chamber 5 from the electromagnet 24 and is received within the annular space between the target core 31 and the tubular flange 34 where the spring 33 is at least partially located. The tubular guide 36 assists in maintaining the position of the target core 31 as the target core and flange 34 slide within the distal housing part 4 of the thermo-magnetic actuator.

As shown in FIG. 2, electrical leads 40 extend through the housing 27 to the coil 25 of the electromagnet 24 to provide electrical current to the coil. The housing 27 is preferably a ferromagnetic material so that an electrically insulating feedthrough 41 may be provided for passage of the leads 40 to the coil 25.

With the magnetically larger ferromagnetic target assembly 30 of the second embodiment of the invention, as already stated, a larger magnetic force can be established between the electromagnet 24 and the magnetic target assembly than in the embodiment of FIG. 1 so that a more secure holding of the piston rod 20 in the extended position can be achieved. FIG. 3 illustrates the electrothermal actuator according to the second embodiment with the piston rod 20 in the retracted position. In this position the return spring 18 holds the piston rod 20 in the retracted position and urges the piston 16, to the maximum mechanical extent, toward the chamber 5. The return spring 18 applies a greater force than the spring 33 that biases the ferromagnetic target assembly 30 in a direction away from the piston 16. If the forces applied by the two springs are not in this relationship, the fully retracted position of the piston rod 20 cannot be achieved.

FIG. 4 shows in cross-section the piston rod 20 in the extended position due to the application of electrical power to the heater 6. In that state, the working fluid has been converted to a gas phase and has driven the piston 16, through the rolling diaphragm 14, to the left in the FIG. 4 against the force of the return spring 18. So long as electrical power is continued to be supplied to the heater 6, this position is maintained with both the primary spring 18 and the secondary spring 33 compressed. The guide pin 32, in this situation, remains confined within the piston 16.

FIG. 5 illustrates the thermo-magnetic actuator with the piston rod 20 fully extended, after that position has been initially achieved through the application of electrical power to the heater 6. However, in FIG. 5, electrical power is no longer supplied to the heater 6, but is still supplied to the coil 25 of the electromagnet 24. As a result of the application of the electrical power to the coil 25, generating a magnetic field, the ferromagnetic target assembly 30 is attracted toward and held against the housing 27 of the electromagnet 24. Preferably, that housing 27 has, when assembled, an annular shape. The central opening in the housing 27 functions as a guide for the sliding of the piston rod 20. The housing itself enhances the magnetic attraction of the ferromagnetic target assembly 30. Since, in the illustrated condition, no electrical power is being supplied to the heater 6, the working fluid, over time, returns to the liquid phase and pressure within the chamber 5 is reduced so that the piston 16 is no longer urged toward the ferromagnetic target assembly 30. To avoid the possibility that the piston 16 and the rolling diaphragm 14 might "float" in this situation, and take undesired positions, the secondary spring 33 urges the piston 16 and the rolling diaphragm 14 toward the positions illustrated in FIG. 3. The guide pin 32, which is surrounded by the coil spring 33, assists in guiding the spring so that the piston 16 and the rolling diaphragm 14 return to their original, quiescent locations within the housing of the thermo-magnetic actuator. Upon interruption of the electrical current flowing to the coil 25 of the electromagnet 24, the ferromagnetic target assembly 30 is driven by the spring 18 so that the piston rod 20 and the magnetic core assembly return relatively rapidly to the position illustrated in FIG. 3, the retracted position of the piston rod 20.

The second embodiment may achieve extended life for the rolling diaphragm 14 by returning the diaphragm to the position of the unenergized thermo-magnetic actuator when the electromagnet is providing the holding power for maintaining the piston rod in the extended position. Undue rapid movement and potential stress of the piston 16 and the rolling diaphragm 14 upon withdrawal of electrical power from the coil 25 of the electromagnet 24 are thereby avoided. In addition, the second embodiment provides all the advantages of the first embodiment, namely substantially lower power consumption than known electrothermal actuators, cooler operating temperature than conventional electrothermal actuators, and retraction of the piston rod upon failure of the power supply.

Preferably, a thermo-magnetic actuator according to the invention includes a position detector for determining when the piston rod 20 is in the extended position. The position detector provides a signal for terminating current flow to the electrical heater 6 when the magnetic field produced by the electromagnet 24 holds the piston rod 20 in the extended position. An example of such a position detector is illustrated in FIGS. 3-5 with respect to the second embodiment of the thermo-magnetic actuator described. However, it is apparent that the same position detector is easily applied to the first embodiment and other versions of the sensor as well. As shown in FIGS. 3-5, the position detector comprises a permanent magnet 35 attached to the side of the ferromagnetic target assembly 30 that faces the chamber 5 and from which the guide pin 32 extends. The permanent magnet 35 is shown as annular in shape. A Hall-effect sensor 45 is mounted on the outside of the distal housing part 4 at a location that is relatively far from the permanent magnet 35 when the piston rod 20 is in the retracted position as shown in FIG. 3 and which is directly opposite the permanent magnet 35 when the piston rod 20 is in the extended position as shown in FIGS. 4 and 5. Hall-effect sensors are commercially available and respond to the application of a magnetic field by, for example, effectively closing a switch. Thus, the Hall-effect sensor 45 can normally function as a closed switch and, when influenced by a magnetic field, for example when the permanent 35 is in the position illustrated in FIGS. 4 and 5, function as an open switch.

Figure 6:
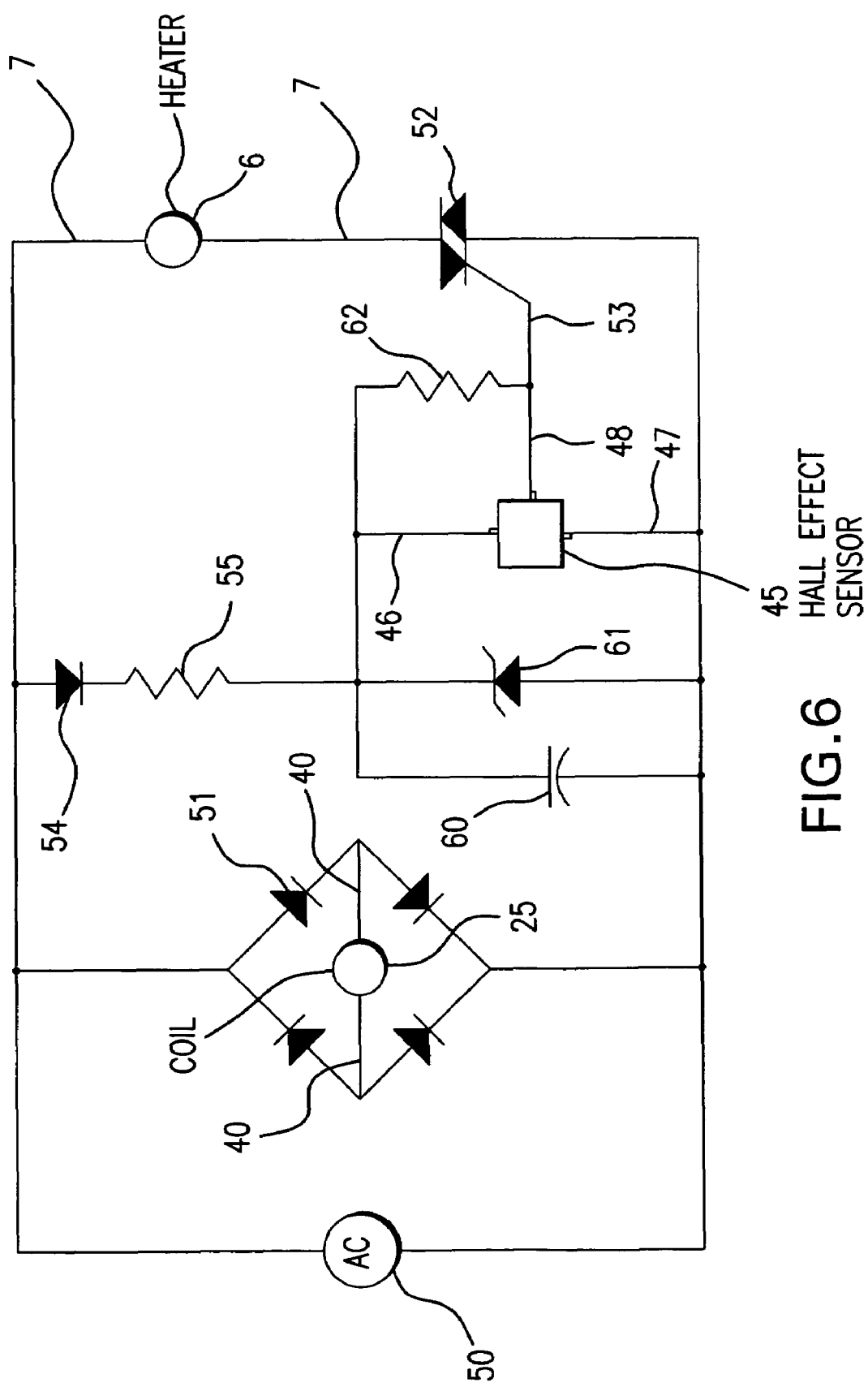
FIG. 6 is a schematic electrical diagram of an example of a control circuit for actuators according to the invention.

A specific example of a control circuit used for supplying power from an AC source to a thermo-magnetic actuator according to the invention and providing for reduced power consumption when the piston rod is in the extended position is shown schematically in FIG. 6. As shown there, an AC power source 50 supplies power through a full-wave rectifier circuit, including four diodes 51, through the leads 40 to the coil 25 of the electromagnet. The bridge circuit provides direct current for the coil 25 of the electromagnet. The same AC power source directly supplies power through leads 7 to the electrical heater 6. The electrical heater 6 is connected in series with the power source 50 through a TRIAC 52, a commercially available gated switch that conducts alternating current. The TRIAC 52 can be made conducting or can function as an open circuit depending upon the state of the electrical signal applied to the gate 53 of the TRIAC 52.

The control circuit of FIG. 6 also includes a rectifying diode 54 that is connected in series with a current limiting resistor 55 which, in turn, is connected to a circuit including several elements connected in parallel. The elements connected in parallel include a capacitor 60 for bypassing high frequency signals, and a Zener diode 61 that is reverse biased in order to establish a relatively constant voltage across the elements that are connected in parallel. The Hall-effect sensor 45 is likewise connected in parallel with the capacitor 60 and the Zener diode 61. The Hall-effect sensor includes three terminals, 46-48. The terminals 46 and 47 are employed to apply a bias voltage across the Hall-effect sensor and terminal 48 is the controlled terminal that, according to the magnitude of the magnetic field applied to the Hall-effect sensor, produces an open or closed circuit function between the terminals 47 and 48. In the circuit of FIG. 6, a pull-up resistor 62 is connected between the terminals 46 and 48 of the Hall-effect sensor 45. The controlled terminal 48 of the Hall-effect sensor is directly connected to the gate of the TRIAC 52.

The operation of the control circuit of FIG. 6 is easily understood. When alternating current power is supplied from the source 50 and the thermo-magnetic actuator begins to extend the piston rod, current flows through the heater 6 because the TRIAC 52 functions as the closed circuit with a "high" signal applied to the gate 53. After the piston rod is extended, the permanent magnet 35 (shown in FIGS. 3-5) causes a change in state of the Hall-effect sensor, effectively short circuiting the terminals 47 and 48, triggering the TRIAC 52 so that the gate 53 goes "low". The low gate signal causes the TRIAC to function as an open circuit so that current no longer flows through the electrical heater 6. However, so long as power is continued to be supplied by the source 50, current continues to flow through the coil 25 of the electromagnet. Thus, the ferromagnetic target assembly is held in place, with the piston rod in the extended position, by the magnetic field generated by the electromagnet. Very little electrical power is, in that condition, consumed by the circuit elements 45, 54, 55, 60, and 61 so that essentially all of the power consumption is limited to the electromagnet. Upon the withdrawal of power from the power source 50, intentionally or unintentionally, current flow to the coil 25 terminates so that the piston rod is released and returns to the retracted position.

While the circuit of FIG. 6 is designed to work with an AC power source, a similar circuit, readily apparent to one of ordinary skill in the relevant arts, can be prepared for a DC power source. In that instance, the bridge including the rectifiers 51 is unnecessary and the coil 40 may be connected, with or without a current-limiting resistor, in parallel with the power source. The TRIAC 52 would be replaced by a field effect transistor or a bipolar transistor with only minor design changes in the circuit. The overall function of the circuit in conjunction with the position sensor, comprising the permanent magnet and the Hall-effect sensor 45, is the same as already described.

The foregoing description pertains to particularly preferred embodiments of the invention, but is not intended to limit the invention to the particular embodiments described. The scope of the invention is defined solely by the following claims.

We claim:

1. A thermo-magnetic actuator comprising:
   a housing;
   a chamber within the housing;
   a working fluid changing phase upon heating and located in the chamber;
   an electrical heater disposed within the chamber for heating the working fluid upon application of electrical power to the electrical heater;
   a piston rod slidably disposed in the housing and movable between a retracted position, retracted with respect to the housing, and an extended position extending outward of the housing, the piston rod being driven and sliding from the retracted position to the extended position in response to heating of the working fluid by the electrical heater;
   a first spring biasing the piston rod toward the retracted position;
   an electromagnet disposed at an end of the housing and generating a magnetic field when an electric current is supplied to the electromagnet;
   a ferromagnetic target assembly attached to the piston rod, sliding within the housing, and attracted toward the electromagnet, when an electrical current flows through the electromagnet, to maintain the piston rod in the extended position even if electrical power is no longer applied to the heater, wherein the ferromagnetic target assembly includes
      a ferromagnetic core to which one end of the piston rod is attached, the ferromagnetic core sliding within the housing, and
      a guide pin attached to the ferromagnetic core and extending from an end of the ferromagnetic core opposite the end of the ferromagnetic core from which the piston rod extends;
   a rolling diaphragm driven by the working fluid; and
   a piston contacting and driven by the rolling diaphragm and sliding within the housing upon expansion of the working fluid, the piston including a hollow portion receiving the guide pin.

2. The thermo-magnetic actuator according to claim 1 including a second spring biasing the ferromagnetic target assembly away from the piston.

3. The thermo-magnetic actuator according to claim 2, wherein the first spring applies a larger biasing force than the second spring.

4. A thermo-magnetic actuator comprising:
   a housing;
   a chamber within the housing;
   a working fluid changing phase upon heating and located in the chamber;
   an electrical heater disposed within the chamber for heating the working fluid upon application of electrical power to the electrical heater;
   a piston rod slidably disposed in the housing and movable between a retracted position, retracted with respect to the housing, and an extended position extending outward of the housing, the piston rod being driven and sliding from the retracted position to the extended position in response to heating of the working fluid by the electrical heater;
   a spring biasing the piston rod toward the retracted position;
   an electromagnet disposed at an end of the housing and generating a magnetic field when an electric current is supplied to the electromagnet;
   a ferromagnetic target assembly attached to the piston rod, sliding within the housing, and attracted toward the electromagnet, when an electrical current flows through the electromagnet, to maintain the piston rod in the extended position even if electrical power is no longer applied to the heater, wherein the ferromagnetic target assembly includes
      a ferromagnetic core to which one end of the piston rod is attached, the ferromagnetic core sliding within the housing, and
      a tubular flange fixed to and defining an annular space with the ferromagnetic core, the first spring being received within the annular space.

5. The thermo-magnetic actuator according to claim 4 including a tubular guide projecting from the electromagnet toward the chamber and received in the annular space for guiding sliding of the ferromagnetic target assembly within the housing.

6. The thermo-magnetic actuator according to claim 1 including a position detector for detecting whether the piston rod is in the extended position or the retracted position.

7. The thermo-magnetic actuator according to claim 6, wherein the position detector comprises a permanent magnet mounted on the ferromagnetic target assembly and a magnetic field sensor mounted on the housing for sensing proximity of the permanent magnet when the piston rod is in only one of the extended and retracted positions.

8. The thermo-magnetic actuator according to claim 7, wherein the magnetic field sensor is a Hall-effect sensor triggering a switch to terminate electrical current flow to the electrical heater in response to detection of the piston rod in the extended position.

9. The thermo-magnetic actuator according to claim 4 including a position detector for detecting whether the piston rod is in the extended position or the retracted position.

10. The thermo-magnetic actuator according to claim 9, wherein the position detector comprises a permanent magnet mounted on the ferromagnetic target assembly and a magnetic field sensor mounted on the housing for sensing proximity of the permanent magnet when the piston rod is in only one of the extended and retracted positions.

11. The thermo-magnetic actuator according to claim 10, wherein the magnetic field sensor is a Hall-effect sensor triggering a switch to terminate electrical current flow to the electrical heater in response to detection of the piston rod in the extended position.

* * * * *